US009829347B2

United States Patent
Tiapkin et al.

(10) Patent No.: US 9,829,347 B2
(45) Date of Patent: Nov. 28, 2017

(54) CAPACITANCE SENSATION UNIT OF PLANE POSITION MEASUREMENT DEVICE

(71) Applicant: HIWIN MIKROSYSTEM CORP., Taichung (TW)

(72) Inventors: Mikhail Tiapkin, Moscow (RU); Gennady Tyapkin, Moscow (RU); Aleksandr Balkovoi, Moscow (RU); Galina Slivinskaya, Moscow (RU); Victor Cacenkin, Moscow (RU)

(73) Assignee: HIWIN MIKROSYSTEM CORP., Taichung (TW)

( * ) Notice: Subject to any disclaimer, the term of this patent is extended or adjusted under 35 U.S.C. 154(b) by 243 days.

(21) Appl. No.: 14/730,128

(22) Filed: Jun. 3, 2015

(65) Prior Publication Data

US 2016/0356629 A1    Dec. 8, 2016

(51) Int. Cl.
*G08C 19/10*    (2006.01)
*G01D 5/241*    (2006.01)

(52) U.S. Cl.
CPC .................................. *G01D 5/2415* (2013.01)

(58) Field of Classification Search
CPC .... G01R 27/2605; G01R 27/26; G01R 15/16; G01R 1/30; G08B 21/24; G08B 21/0453; G08B 21/22; G08B 13/1445; G08B 21/02; G08B 21/043; G08B 21/0446; G08B 21/182; G08B 3/10; G08B 5/36; G08B 13/08; G08B 13/1454
USPC ..... 324/660, 686, 688, 61 R, 61 P, 519, 347, 324/358, 444, 447
See application file for complete search history.

(56) References Cited

U.S. PATENT DOCUMENTS

| RE27,436 | E | 7/1972 | Sawyer |
| 4,893,071 | A * | 1/1990 | Miller .................. G01D 5/2415 324/660 |
| 5,818,039 | A | 10/1998 | Lampson |
| 6,175,169 | B1 | 1/2001 | Hollis |
| 6,448,792 | B1 * | 9/2002 | Yoshida ................. G01B 7/003 324/660 |
| 6,476,601 | B2 | 11/2002 | Zharski |
| 6,492,911 | B1 * | 12/2002 | Netzer ................. G01D 5/2415 318/662 |
| 2002/0159016 | A1 * | 10/2002 | Nishida ............. G02F 1/134363 349/141 |
| 2007/0120831 | A1 * | 5/2007 | Mahowald .......... G06F 3/03548 345/173 |
| 2010/0019617 | A1 * | 1/2010 | Murari ................... H02N 1/006 310/300 |
| 2013/0240339 | A1 * | 9/2013 | Miyazaki ............. G06F 3/0202 200/5 A |

* cited by examiner

*Primary Examiner* — Jermele M Hollington
*Assistant Examiner* — Taqi Nasir
(74) *Attorney, Agent, or Firm* — Guice Patents PLLC

(57) ABSTRACT

A capacitance sensation unit of plane position measurement device for performing measurement with submicron definition is able to measure both two-dimensional position and rotational angle relative to a plane object. The main application of the capacitance sensation unit is exemplified with the position measurement of the mover of a flat motor. The capacitance sensation unit is able to measure the position and rotational angle of the mover relative to the surface of a stator in the form of a flat plate.

15 Claims, 9 Drawing Sheets

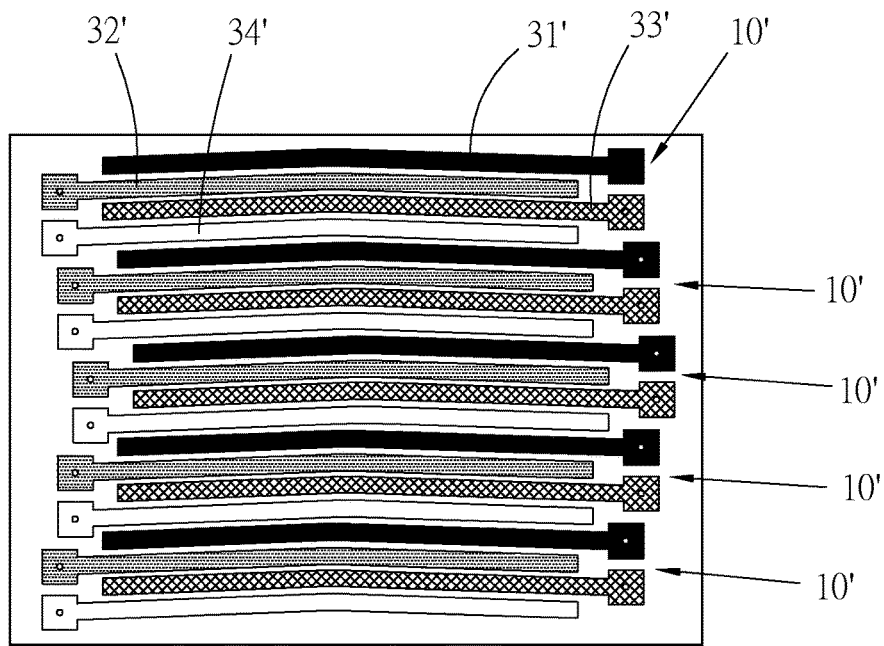
Fog. 5
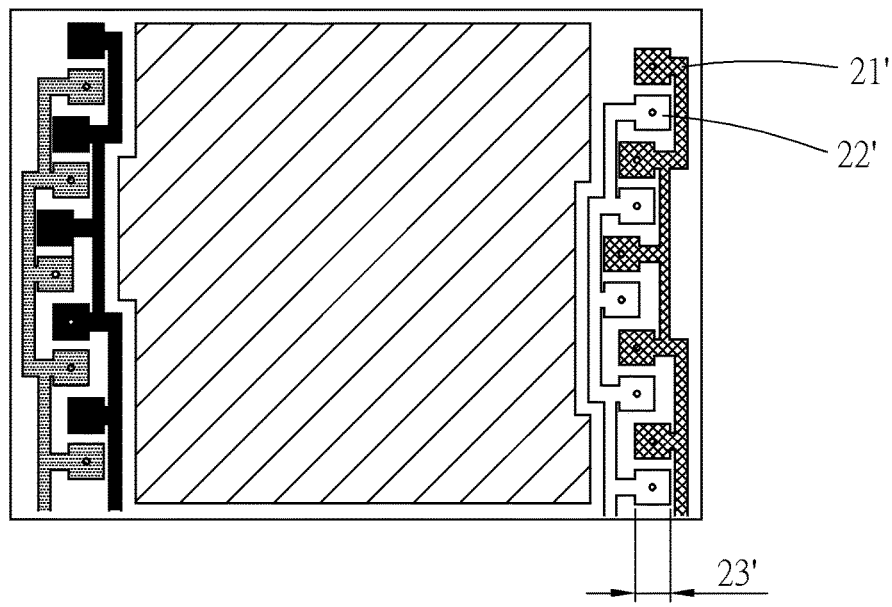
Fig. 6

CAPACITANCE SENSATION UNIT OF PLANE POSITION MEASUREMENT DEVICE

BACKGROUND OF THE INVENTION

1. Field of the Invention

The present invention relates generally to a position measurement technique, and more particularly to a capacitance sensation unit of plane position measurement device.

2. Description of the Related Art

U.S. Pat. No. RE27436 discloses a technique related to flat stepping motor. The basic structure of the flat stepping motor is mainly composed of a flat steel plate and a mover movable on the surface of the steel plate. The mover is able to interact with the magnetic field produced by multiple stator teeth two-dimensionally arranged on the surface of the steel plate in a checkerboard pattern. Accordingly, the mover can quickly and precisely move on the surface of the steel plate. However, such flat stepping motor necessitates a laser interferometer for performing position measurement. The laser interferometer is quite expensive and complicated so that the substantial application range of the flat stepping motor is greatly limited.

Many conventional sensation techniques have been disclosed and used for performing practical sensation and measurement of the position of the mover of the flat motor. For example, U.S. Pat. No. 6,476,601 discloses a compensation magnetic sensor on the basis of Hall sensation. Such sensor is too sensitive to the residual magnetization affection of the stator teeth. As a result, the practical application of such sensor is limited.

U.S. Pat. No. 6,175,169 discloses an improved electromagnetic sensor, which is integrated with the mover. The electromagnetic sensor has submicron-level sensation ability. However, the precision of such electromagnetic sensor is lowered with the crossmodulation effect, affection of magnetic flux of the mover and the defects of the stator teeth due to small-scale sensation. Therefore, such electromagnetic sensor is still not perfect.

U.S. Pat. No. 5,818,039 discloses a sensation device based on optical sensation technique. Such sensation device is able to detect the change of position through fluorescence. However, such sensation device has a quite large volume so that it is impossible to integrally arrange the sensation device in the mover. This limits the application of such sensation device in the field of flat motor. Also, such sensation device can hardly provide uniform dyeing concentration and is unable to remove the noise in the position signal. As a result, such sensation device cannot perform precise position measurement.

In the above different sensation techniques, the technical essences are all limited. Therefore, none of the above sensation techniques can provide an optimal position measurement for the flat motor. Thanks to the development of flat motor manufacturing technique, the flat motor can have a stable air gap. The stable air gap is a basis for the capacitance measurement technique. Accordingly, the capacitance measurement technique with nano-definition precision and insensitivity to magnetic flux has become a most often used technique for plane position measurement.

Concerning the capacitance measurement technique, U.S. Pat. No. 6,492,911 discloses a sensor based on rotational and linear capacitances. Such sensor can modulate the position through electrodes in a specific configuration. However, due to the specialness of the configuration, such sensor cannot be applied to the plane linear motor.

In addition, U.S. Pat. No. 4,893,071 discloses a capacitance sensation technique performing position measurement on the basis of the stator teeth. However, in such capacitance sensation technique, the harmonic wave distortion of the position sensation signal will greatly lower the precision. Also, the technique for rectifying and adjusting the relative motional position of the sensor is too complicated to integrate the sensor on the armature of the mover.

SUMMARY OF THE INVENTION

It is therefore a primary object of the present invention to provide a capacitance sensation unit of plane position measurement device. The capacitance sensation unit is able to perform high-precision and high-definition uniaxial or multiaxial measurement of rotational position and angle.

To achieve the above and other objects, the capacitance sensation unit of plane position measurement device of the present invention includes a movable main body and a sensation section for performing one-dimensional sensation in a virtual sensation axis. The sensation section has multiple elongated sensation electrodes. The sensation electrodes are disposed on one face of the main body in parallel to each other at intervals with their lengthwise directions substantially normal to the sensation axis. The lengthwise directions of two ends of each of the sensation electrodes contain an angle unequal to 180 degrees.

In the above capacitance sensation unit, the angle contained between the lengthwise directions of two ends of each of the sensation electrodes is preferably an obtuse angle and each of the sensation electrodes has a V-shaped inclined configuration.

In the above capacitance sensation unit, the sensation electrodes have equal widths and are arranged at equal intervals.

In the above capacitance sensation unit, there are multiple sensation sections, which are disposed on one surface of the main body for enhancing the measurement precision.

In the above capacitance sensation unit, the sensation sections are sequentially arranged along a linear arrangement axis or Z-shaped non-single arrangement axes. In other words, according to different sensation requirements, the sensation sections can be arranged in a specific order to as enlarge the sensation range as possible and enhance the measurement precision.

In the above capacitance sensation unit, the sensation axes of the sensation sections are parallel to the arrangement axis, whereby the sensation directions of the sensation sections are directed in the same direction to achieve a one-dimensional sensation assembly.

In the above capacitance sensation unit, the sensation sections are sequentially arranged along the arrangement axis in a stepped pattern to increase the sample number and enlarge the sensation range.

In the above capacitance sensation unit, the sensation axes of two adjacent sensation sections are normal to each other to perform at least two-dimensional position sensation.

In the above capacitance sensation unit, there are at least two sensation sections, which are symmetrically disposed on one face of the main body about a geometrical center.

In the above capacitance sensation unit, the inclination directions of the sensation electrodes of the sensation section are reverse to each other.

In the above capacitance sensation unit, the rearmost sensation electrodes of the respective sensation sections in the inclination directions are correspondingly positioned where the geometrical center is positioned.

The present invention can be best understood through the following description and accompanying drawings, wherein:

BRIEF DESCRIPTION OF THE DRAWINGS

FIG. 5 is a bottom view of the second embodiment of the present invention;

FIG. 6 is a top view of the second embodiment of the present invention;

DETAILED DESCRIPTION OF THE PREFERRED EMBODIMENTS

Figure 1:
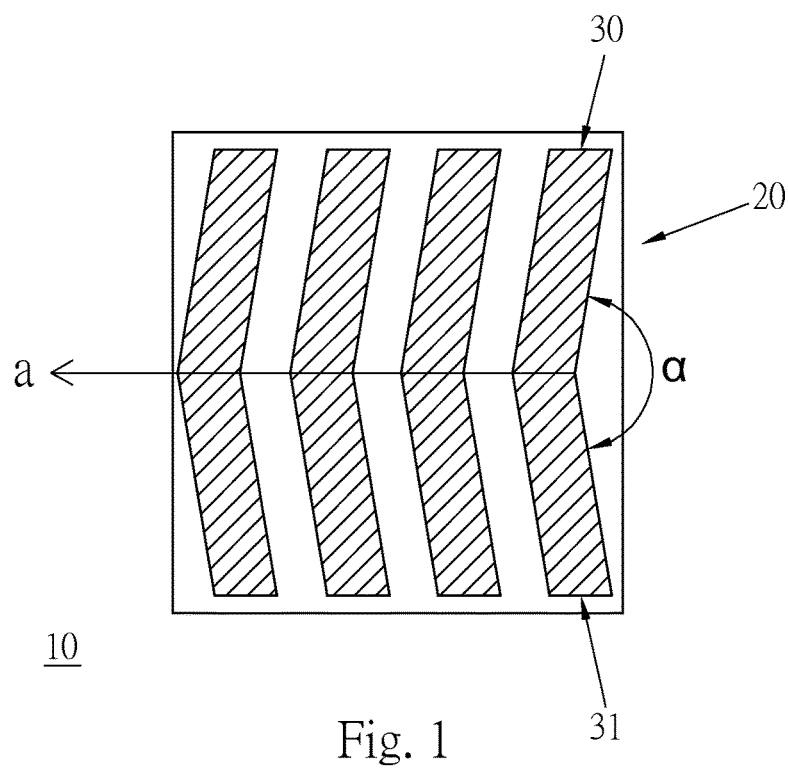
FIG. 1 is a plane view of a first embodiment of the present invention.

Please refer to FIG. 1. According to a first embodiment, the capacitance sensation unit 10 of the plane position measurement device of the present invention includes a main body 20 and a sensation section 30.

The main body 20 is a circuit board with a certain size for disposing the sensation section 30 thereon. The main body 20 has a connection circuit for electrically connecting an external circuit with the sensation section 30.

The sensation section 30 has four elongated sensation electrodes 31, 32, 33, 34 with equal width. The sensation electrodes 31, 32, 33, 34 are disposed on one face of the main body 20 in parallel to each other at equal intervals. The lengthwise directions of two ends of each of the sensation electrodes 31, 32, 33, 34 contain an obtuse angle α. Accordingly, two ends of each of the sensation electrodes 31, 32, 33, 34 respectively obliquely extend from the center thereof to two lateral sides, whereby each of the sensation electrodes 31, 32, 33, 34 has a substantially V-shaped configuration.

Figure 2:
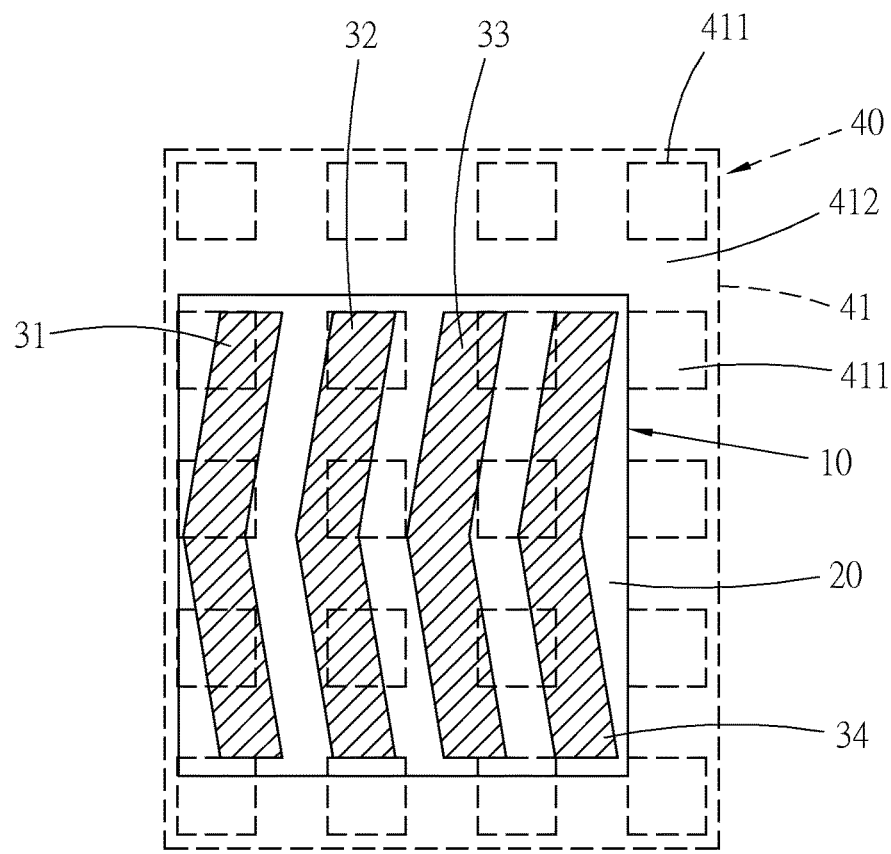
FIG. 2 is a plane view showing the use of the first embodiment of the present invention.
Figure 3:
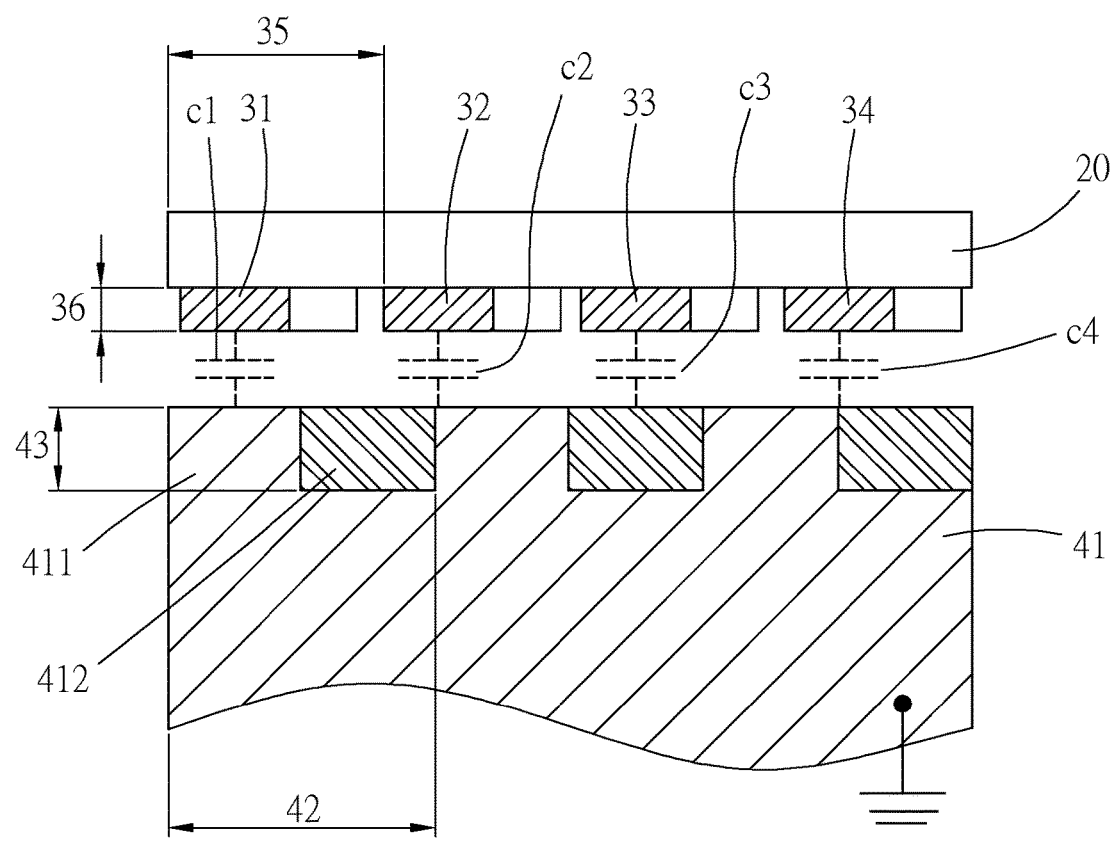
FIG. 3 is a sectional view of the first embodiment of the present invention.

Accordingly, as shown in FIGS. 2 and 3, the plane position measurement device with the capacitance sensation unit 10 is integrally arranged in the mover (not shown) of a flat motor 40 for sensing the displacement position of the mover relative to a flat stator 41.

The flat motor 40 pertains to prior art. The stator 41 of the flat motor 40 has the form of a flat plate. The stator 41 has multiple conductive stator teeth 411 arranged in a checkerboard pattern. Also, in order to keep the surface of the stator 41 tidy and provide proper protection for the stator teeth 411, an insulation packaging material such as epoxy is filled and distributed in the tooth spaces 412 between the stator teeth 411. Under such circumstance, the surface of the stator 41 can keep tidy and the air gap formed between the stator 41 and the mover can have a stable size.

The capacitance sensation unit 10 is directly fixedly disposed on the mover via the main body 20 with the sensation section 30 positioned on one face of the mover that faces the stator 41. Accordingly, the sensation electrodes 31 are spaced from the corresponding conductive stator teeth 411 by the air gaps to respectively produce corresponding capacitance C. A conventional processing circuit composed of a trigger circuit, measurement circuit and digital interpolator is used to process the sensation signals. The processing technique of the sensation signals is not the subject matter of the present invention and thus will not be further described hereinafter.

However, it should be specifically noted that in this embodiment, the sizes of the sensation electrodes 31, 32, 33, 34 and the sizes of the stator teeth 411 have a certain corresponding relationship. Substantially, the sum of the size of one stator tooth 411 and the size of an adjacent tooth space 412 is a stator tooth period 42. The sum of the size of one sensation electrode and the width of the interval between the sensation electrode and an adjacent sensation electrode is an electrode period 35. The electrode period 35 is 3/4 the stator tooth period 42, whereby the sensation section 30 precisely crosses over three stator tooth periods 42.

Also, the thickness 36 of the sensation electrode 31 is minimized to provide a polished surface and reduce the parasitic capacitance.

Moreover, as shown in FIG. 2, in the capacitance C1, C2, C3, C4 respectively produced by the sensation electrodes 31, 32, 33, 34, the first capacitance C1 has a maximum value, while the third capacitance C3 has a minimum value.

Furthermore, the V-shaped inclined configurations of the sensation electrodes 31, 32, 33, 34 help in suppressing the harmonic wave distortion to keep the linear state. In comparison with the conventional technique, the special configuration provided by the present invention is helpful in increasing the precision and sensitivity in position sensation.

According to the above arrangement, the capacitance sensation unit 10 of the plane position measurement device of the present invention is integrally disposed in the mover and movable along with the mover relative to stator 41. When the capacitance sensation unit 10 is moved along with the mover, the sensation section 30 can perform one-dimensional sensation in a virtual sensation axis a. To speak more specifically, the sensation axis a is parallel to the connection line of the lengthwise central points of the sensation electrodes 31, 32, 33, 34. That is, in case of negligence of the angle α, the sensation axis a is normal to the lengthwise direction of the sensation electrodes 31, 32, 33, 34.

Figure 4:
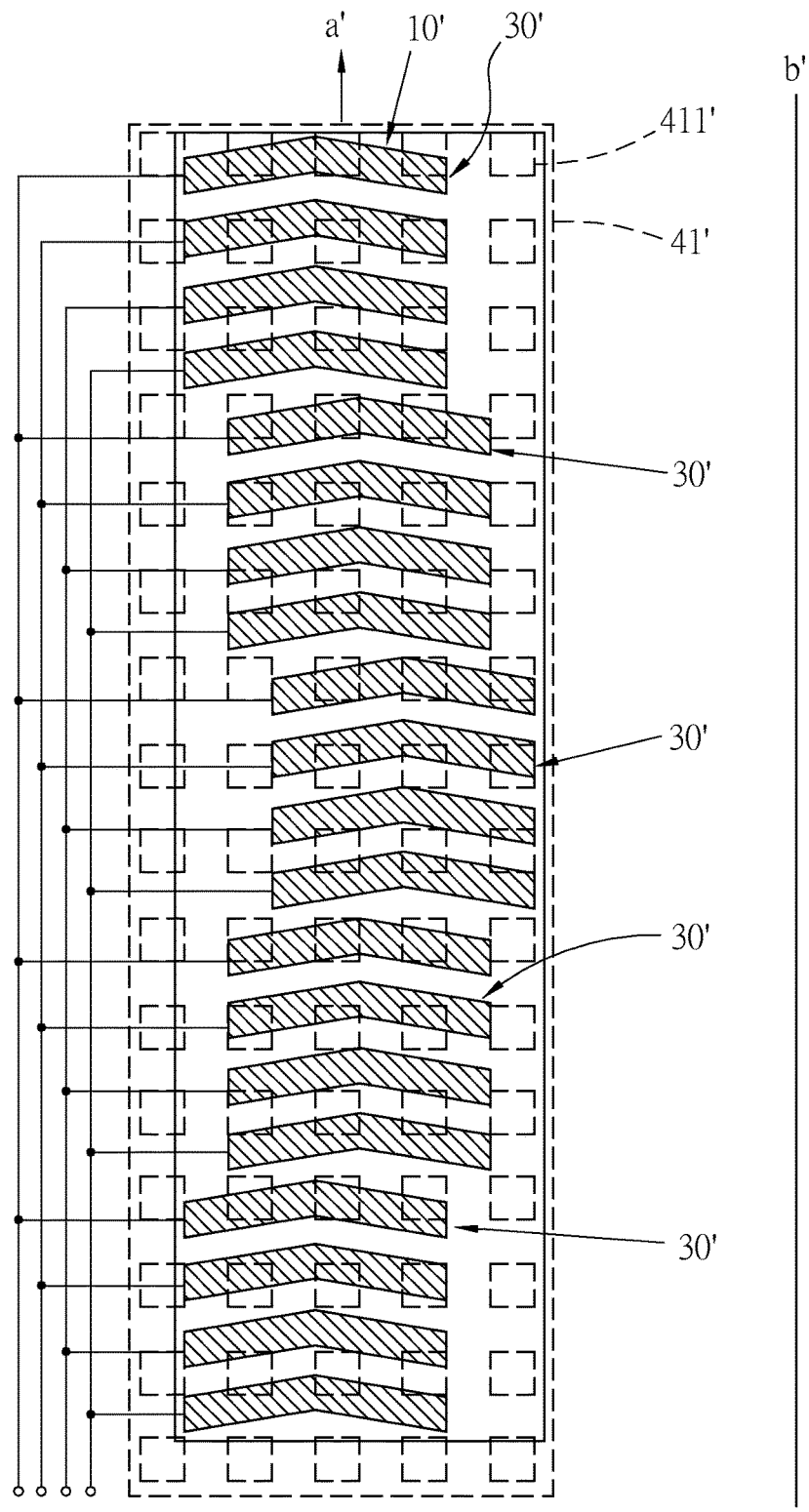
FIG. 4 is a plane view of a second embodiment of the present invention.

Please further refer to FIG. 4. Inevitably, it often takes place that some of the numerous stator teeth 411' are damaged or twisted to affect the stability of the size of the air gap and cause space noise. Therefore, once the structure of the stator teeth 411' is deformed, chipped or otherwise damaged, the basis for the measurement scale will be affected to greatly lower the precision of the capacitance position measured by the sensation section 30'. In order to reduce the affection of the deformation and damage of the stator teeth on the sensation precision, in a second embodiment of the present invention, there are five capacitance sensation units 10' sequentially arranged along a linearly extending arrangement axis b' and the sensation axes a' of the sensation sections 30' are parallel to the arrangement axis b'. In addition, the sensation sections 30' are arranged along the arrangement axis in a stepped pattern. Accordingly, the number of the measurement points of the sensation axes a' is increased and the sensation sections 30' are arranged in a stepped pattern to laterally expand the sensation range.

Under such circumstance, the sensation sample number is greatly increased to lower the affection of the deformation of the stator teeth on the sensation precision.

Figure 7:
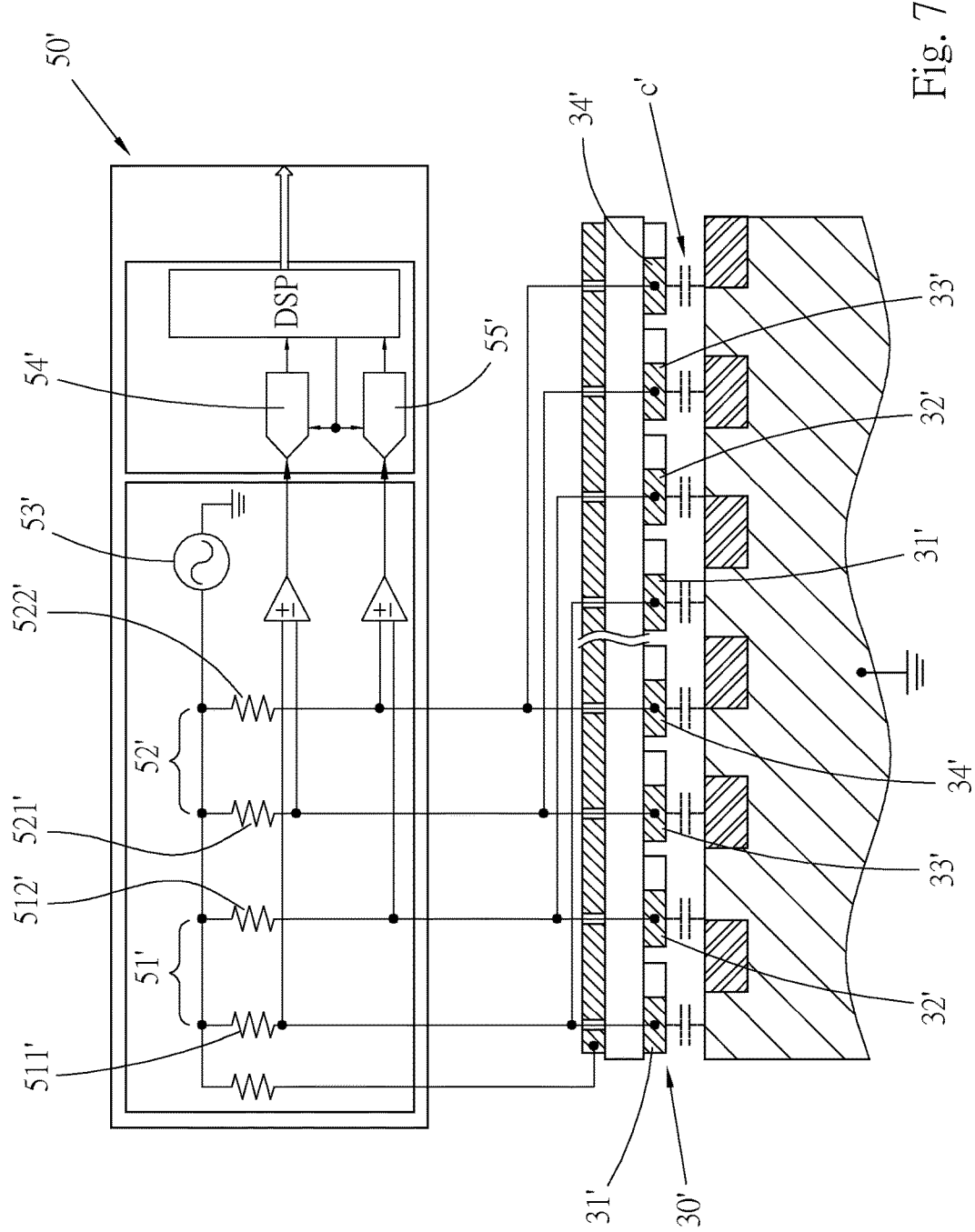
FIG. 7 is a schematic diagram showing that the second embodiment of the present invention is connected to a processing circuit.

Accordingly, as shown in FIG. 7, in use of the one-dimensional sensation assembly 1' composed of multiple sensation units 10' with parallel sensation axes a', a processing circuit 50' is used to process the electronic signals produced by the one-dimensional sensation assembly 1'. However, the position sensation is not performed by directly measuring the respective capacitance values, but is performed on the basis of the voltage corresponding to the capacitance values. To speak more specifically, the sensation electrodes 31, 32, 33, 34 of the respective sensation sections 30' are pair by pair respectively electrically connected to the resistors 511', 512', 521', 522' of two electrical bridges 51', 52'. The low points of the electrical bridges 51', 52' are the grounded surface of the stator 41', while the high points of the electrical bridges 51', 52' are connected to the high-frequency trigger signal produced by an oscillator 53'. The voltage balance positioned in the branches of the electrical bridges 51', 52' are respectively measured by an amplifier 54', 55'.

Figure 8:
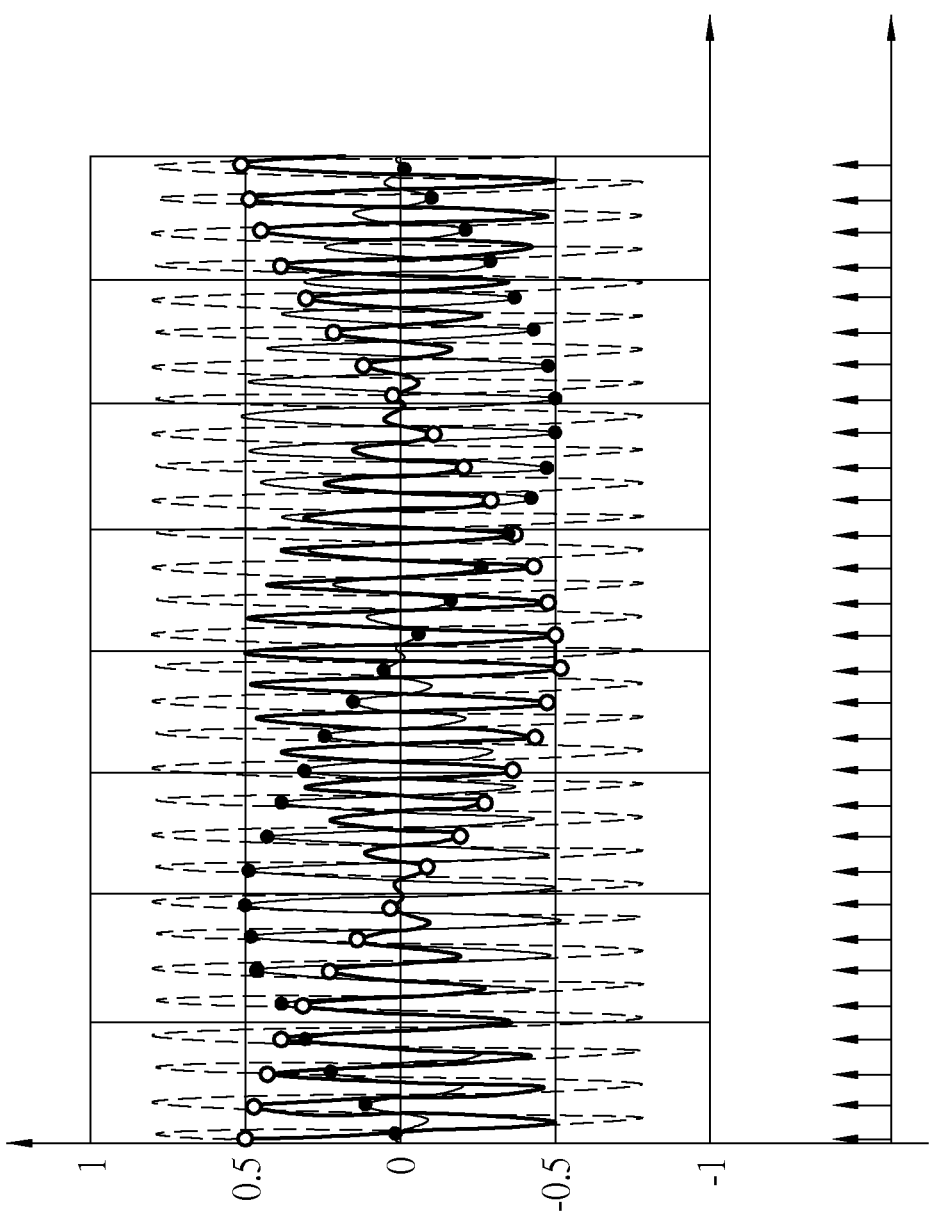
FIG. 8 is a diagram of the sine wave according to the second embodiment of the present invention, output from the processing circuit.

When the one-dimensional sensation assembly 1' is moved with the operation of the mover, the capacitance corresponding to the one-dimensional sensation assembly 1' is also changed therewith to change the voltage balance of the electrical bridges 51', 52'. After processing the signal, a sine wave signal is produced as a calculation basis for the position measurement as shown in FIG. 8.

Figure 9:
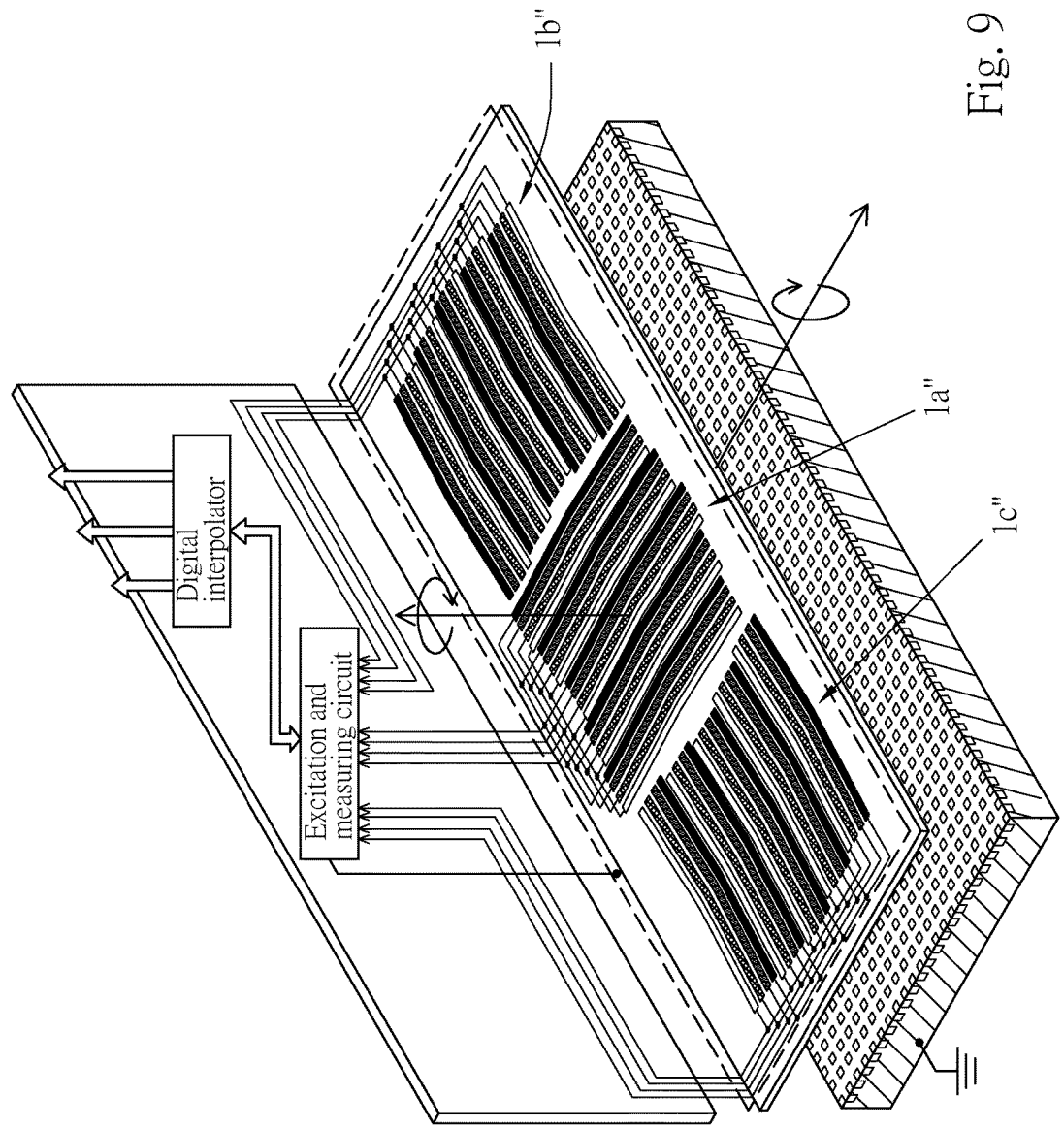
FIG. 9 is a perspective view of a third embodiment of the present invention.
Figure 10:
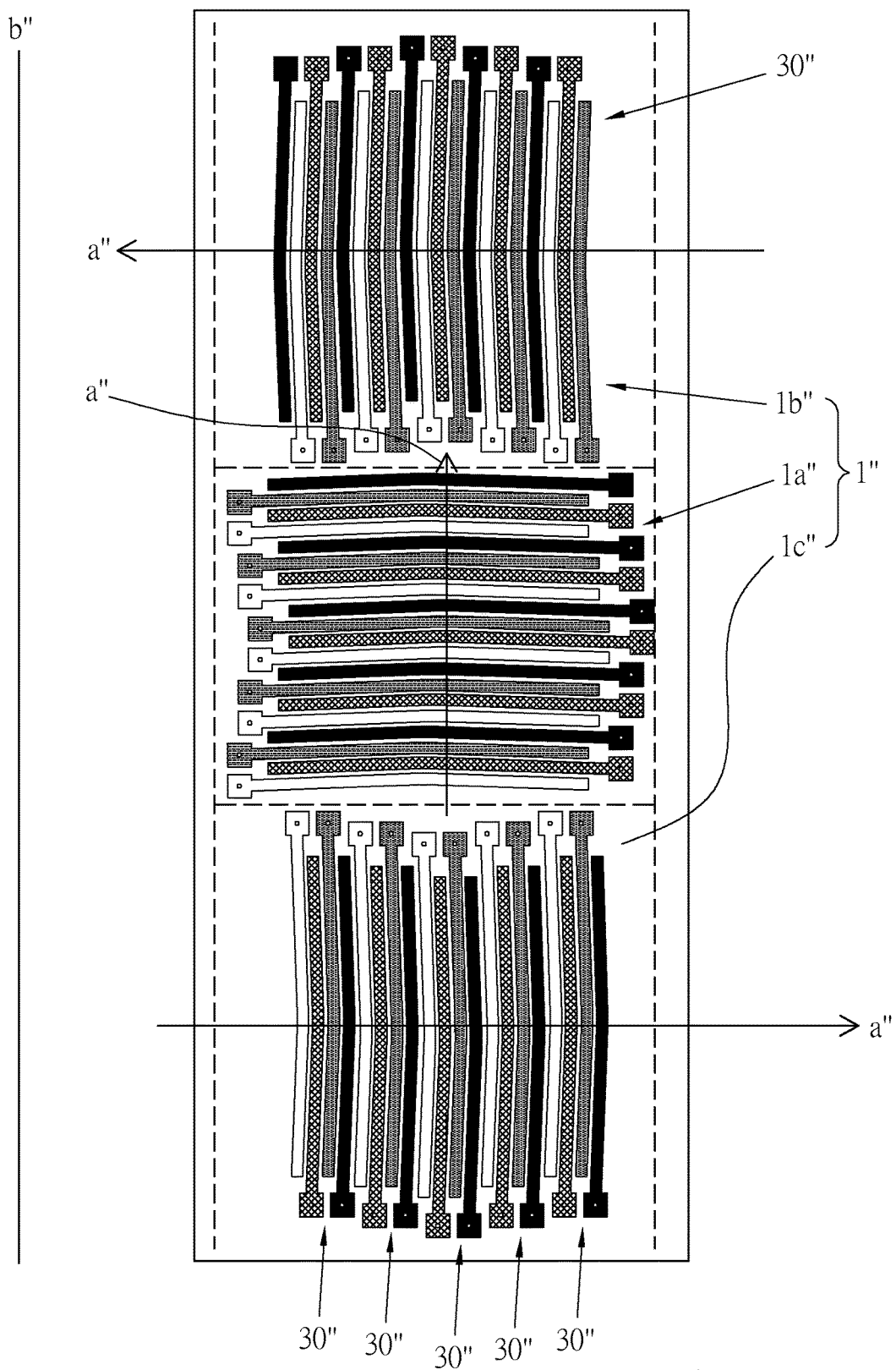
FIG. 10 is a plane view of the third embodiment of the present invention.

Please now refer to FIGS. 9 and 10. In a third embodiment, multiple one-dimensional sensation assemblies 1'' as the second embodiment are combined to perform three-dimensional sensation. In this case, the position and rotational angle on the plane can be measured.

Substantially, in this embodiment, there are three one-dimensional sensation assembles 1a'', 1b'', 1c'' are sequentially arranged along the arrangement axis b''. The sensation axis a'' of the first one-dimensional sensation assembly 1a'' in the middle is parallel to the arrangement axis b'', while the sensation axes a'' of the second and third one-dimensional sensation assemblies 1b'', 1c'' symmetrically arranged on two sides are parallel to each other and normal to the arrangement axis b''.

According to the above arrangement, the respective one-dimensional sensation assemblies 1'' can be used to perform position measurement in different directions. Due to the low sensitivity of the sensation sections 30'' in the direction normal to the sensation axes a'', the interference between the respective one-dimensional sensation assemblies normal to each other can be avoided so that the position sensation can be precisely performed.

Figure 11:
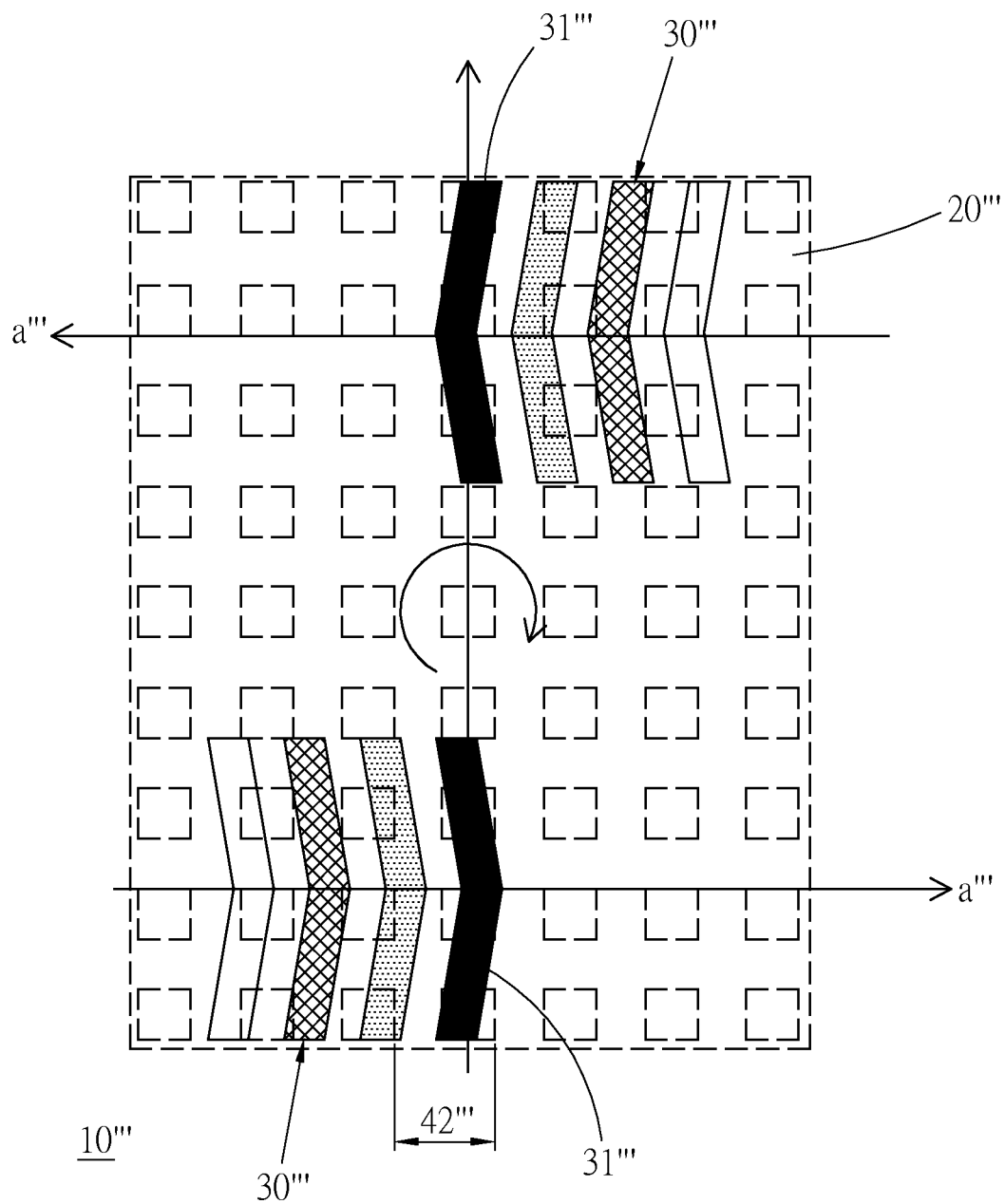
FIG. 11 is a plane view of a fourth embodiment of the present invention.

Furthermore, in addition to the arrangement of the third embodiment, in order to achieve higher precision in measurement of rotational angle, a fourth embodiment of the present invention is provided as shown in FIG. 11. In the fourth embodiment, a capacitance sensation unit 10''' is based on the technique of the first embodiment and there are two sensation sections 30'''. The sensation axes a''' of the sensation sections 30''' are parallel to each other but directed in reverse directions. The sensation sections 30''' are symmetrically disposed on one face of the main body 20''' with a geometrical center serving as the symmetrical axis. In addition, the first sensation electrodes 31''' of the respective sensation sections 30''' are positioned on two sides of the geometrical center to measure the same stator tooth period 42'''.

The above embodiments are only used to illustrate the present invention, not intended to limit the scope thereof. Many modifications of the above embodiments can be made without departing from the spirit of the present invention.

What is claimed is:

1. A capacitance sensation unit of plane position measurement device, comprising:
a movable main body; and
a sensation section for performing one-dimensional sensation in a virtual sensation axis, the sensation section having multiple elongated sensation electrodes, the sensation electrodes being disposed on one face of the main body in parallel to each other at intervals with their lengthwise directions substantially normal to the sensation axis, the lengthwise directions of two ends of each of the sensation electrodes containing an angle unequal to 180 degrees;
wherein the movable main body moves relative to a flat device and determines the amount of displacement relative the flat device by sensing the capacitance value which is sensed by the sensation electrodes.

2. The capacitance sensation unit of plane position measurement device as claimed in claim 1, wherein the lengthwise directions of two ends of each of the sensation electrodes contain an obtuse angle.

3. The capacitance sensation unit of plane position measurement device as claimed in claim 1, wherein each of the sensation electrodes has a V-shaped configuration.

4. The capacitance sensation unit of plane position measurement device as claimed in claim 1, wherein the sensation electrodes have equal widths and are arranged at equal intervals.

5. The capacitance sensation unit of plane position measurement device as claimed in claim 2, wherein the sensation electrodes have equal widths and are arranged at equal intervals.

6. The capacitance sensation unit of plane position measurement device as claimed in claim 3, wherein the sensation electrodes have equal widths and are arranged at equal intervals.

7. The capacitance sensation unit of plane position measurement device as claimed in claim 1, wherein there are multiple sensation sections, which are disposed on one surface of the main body.

8. The capacitance sensation unit of plane position measurement device as claimed in claim 7, wherein the sensation sections are sequentially arranged on one surface of the main body along an arrangement axis.

9. The capacitance sensation unit of plane position measurement device as claimed in claim 7, wherein the sensation axes of the sensation sections are parallel to the arrangement axis.

10. The capacitance sensation unit of plane position measurement device as claimed in claim 9, wherein the sensation sections are arranged along the arrangement axis in a stepped pattern.

11. The capacitance sensation unit of plane position measurement device as claimed in claim 7, wherein the sensation axes of two adjacent sensation sections are normal to each other.

12. The capacitance sensation unit of plane position measurement device as claimed in claim 11, wherein there are three sensation sections.

13. The capacitance sensation unit of plane position measurement device as claimed in claim 1, wherein there are two sensation sections, which are symmetrically disposed on one face of the main body about a corresponding symmetrical axis.

14. The capacitance sensation unit of plane position measurement device as claimed in claim 13, wherein the inclination directions of the sensation electrodes of the sensation section are reverse to each other.

15. The capacitance sensation unit of plane position measurement device as claimed in claim 14, wherein the rearmost sensation electrodes of the respective sensation sections in the inclination directions are correspondingly positioned where the corresponding symmetrical axis is positioned.

\* \* \* \* \*